Feb. 1, 1949. T. E. LUZAR 2,460,591
DENTAL FLOSS TOOTH CLEANING APPARATUS
Filed Nov. 29, 1946
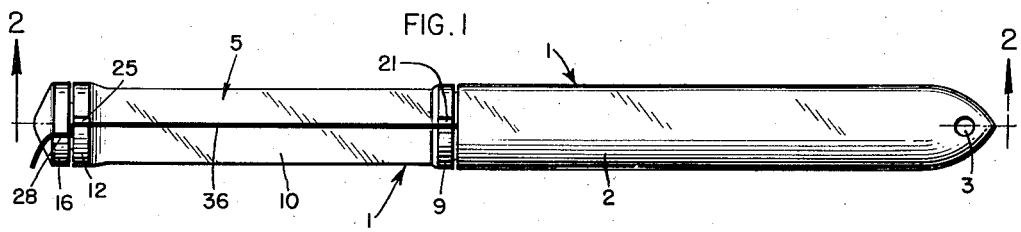
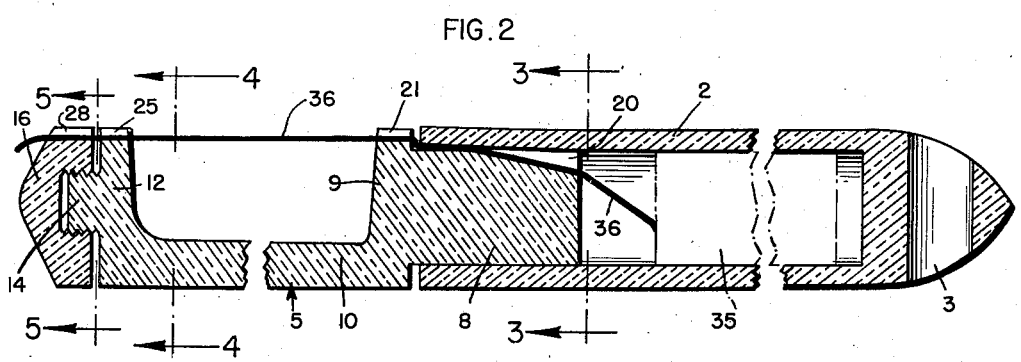
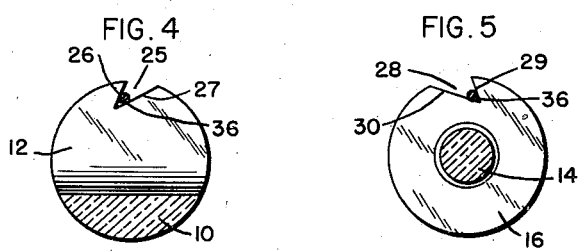
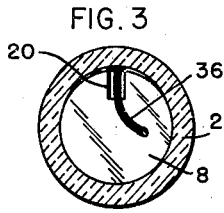
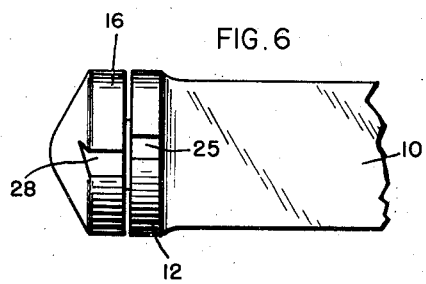
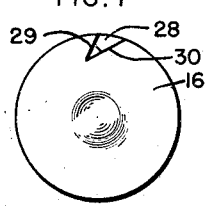
INVENTOR
THOMAS E. LUZAR
BY
ATTORNEY Patented Feb. 1, 1949

2,460,591

UNITED STATES PATENT OFFICE 2,460,591

DENTAL FLOSS TOOTH CLEANING APPARATUS

Thomas E. Luzar, Chicago, Ill.

Application November 29, 1946, Serial No. 712,785

3 Claims. (Cl. 132—92)

1

This invention relates to apparatus for receiving and holding dental floss while the same is being used for cleaning the teeth.

It is one of the objects of the present invention to provide a dental floss holder of the above mentioned character which will be simple and economical of construction and will have a minimum number of parts consistent with its proper functioning in the manner intended.

In accordance with the principles of the present invention there is provided a holder which consists of two main parts, namely, a receptacle for dental floss and a frame or bow for gripping a portion of the floss and holding it in a position facilitating forcing of the strand of floss into the interstitial spaces. In accordance with the present invention the bow makes a sliding fit directly into the container without the use of intermediate nipples or the like and constitutes a closure for the container while the container constitutes a handle for the bow. The dental floss is wedged at the joint between the handle and the bow without impairing the security of the bow on the handle and also permitting the ready drawing of additional lengths of dental floss from the holder as the length of floss in the bow is progressively used up.

It is a still further object of the present invention to provide a simple and convenient means for clamping the end of the dental floss in place in the bow.

The attainment of the above and further objects of the present invention will be apparent from the following specification taken in conjunction with the accompanying drawing forming a part thereof.

In the drawing:

Figure 1 is a plan view of a dental floss holder embodying the present invention;

Figure 2 is an enlarged sectional view taken along the line 2—2 of Figure 1 and looking in the direction of the arrows;

Figure 3 is a section taken along the line 3—3 of Figure 2;

Figure 4 is a section taken along the line 4—4 of Figure 2;

Figure 5 is a section taken along the line 5—5 of Figure 2;

Figure 6 is an enlarged top view of the left hand end of Figure 2; and

Figure 7 is a view of the left hand end of the dental floss holder.

The dental floss holder is indicated in general by the reference numeral 1 and comprises a tube 2 open at the left hand end and closed at the

2 right hand end, which tube may have a perforation 3 therein to facilitate hanging up of the tube. The interior surface of the open end of the tube is smooth and circular in cross section. A bow 5 is releasably secured in the tube. The bow has a cylindrical shank 8 that makes a snug sliding fit inside the tube 2. A circular flange 9 on the bow limits the extent of insertion of the shank 8 into the tube 2. The bow includes a long arm 10 extending from the flange 9 and terminating in a forward circular flange 12 that has a forward extending screw threaded stud 14 integral therewith. The entire bow 5 including the flanges 9—12, the shank 8 and the stud 14 all constitute one integral structure, preferably of plastic material. The entire unit may be made from a plastic rod by turning down one end of it to form the shank 8 and turning down the other end to form a stud 14 and removing some of the material between the flanges 9 and 12. A cap 16 having a suitable threaded bore threads onto the stud 14. The threads on the stud and the cooperating threads on the cap 16 are preferably of a wide pitch so that the cap 16 is turned through only a fraction of a complete revolution from the time is first engages the thread until the cap abuts against the flange 12.

The shank 8 has a narrow slot 20 therein which is tapered in depth, being deepest at the end of the shank furthest from the flange 9. This slot is in line with a longitudinal slot 21 in the flange 9, but terminates short of the flange so that a portion of the length of the shank within the tube is not slotted.

The flange 12 has a tapered V slot 25 formed therein in line with the slot 21. The slot 25 includes a side 26 at a small angle to a radius drawn to the center of the circle seen in Figure 4 and a side 27 at a larger end. The head 16 has a slot 28 formed in the cylindrical portion thereof, that slot having a side 29 at a small angle to a radius as seen in Figure 5, and a side 30 at a larger angle to a radius. The slots 25 and 28 are of the same shape but are tilted in opposite directions, as may be seen in Figures 4 and 5.

In use of the device of the present invention a roll 35 of dental floss is placed in the handle 2, and the end of the strand 36 of the dental floss is stretched through the slot 20 in the shank 8 and through the slot 21 in the flange 9. The bow 5 is then moved into a position such that the shank thereof enters the tube 2. The strand 36 of dental floss, which is shown in exaggerated thickness for illustrative purposes, is thus tightly wedged between a short portion of the length of the shank 8 and the inside of the tube 2. The dental floss is sufficiently thin and deformable to permit this action, the end of the tube 2 being stretched radially outwardly by an imperceptible amount. The strand 36 is then positioned across the slot 25 of the flange 12 and is also positioned across the slot 28 in the cap 16. The strand is then drawn taut and the cap 16 is then tightened on the stud 14. As the cap is turned the end of the strand past the bow and the cap is held so that turning of the cap causes the walls of the slot 25 to pull the strand 36 tightly across the bow. The cord 36 is thus drawn taut and is tightly clamped between the facing surfaces of the flange 12 and the cap 16. The strand 36 is thus held taut across the bow 5. Then the instrument may be used for cleaning the interstitial spaces between the teeth. When the portion of the strand within the bow has been used and is to be replaced, it is merely necessary to loosen the cap 16, without removing it from the stud 14, and then to pull the bow 5 outwardly of the handle 2. An additional length of dental floss may then be pulled through the slot 28 and then the bow may then be again pushed back into position in the handle, thus again wedging the strand between the shank 8 and the handle 2, and then the end of the strand again drawn taut over the flange 12 and the cap 16 and the cap then tightened as previously stated.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. A dental strand holding and tensioning device comprising a tubular handle closed at one end and open at the other end and constituting a receptacle for a roll of dental floss, the open end of the tube having a smooth interior surface, a bow-shaped frame having a shank making a snug sliding fit in the end of the handle, a portion of the length of the shank that extends into the tube having a slot in the surface thereof for receiving a portion of the length of a dental strand, the slot terminating within the portion of the shank that is inside the tube and at a portion thereof being of a depth less than the thickness of a dental strand held in the device so that the strand may be wedged and locked between the shank and the inner surface of the end of the tube.

2. A dental strand holding and tensioning device comprising a tubular handle closed at one end and open at the other end and constituting a receptacle for a roll of dental floss, the open end of the tube having a smooth interior surface, a bow-shaped frame having a shank making a snug sliding fit in the end of the handle, a portion of the length of the shank that extends into the tube having a slot in the surface thereof for receiving a portion of the length of a dental strand, the slot terminating within the portion of the shank that is inside the tube so that the strand may be wedged and locked between the shank and the inner surface of the end of the tube, the bow having a flange adjacent the shank and an outer flange at the opposite end thereof, aligned strand slots in the periphery of the flanges, and means associated with the last mentioned flange for releasably locking the end of a strand of dental floss that is drawn across the bow.

3. A dental strand holding and tensioning device comprising a tubular handle closed at one end and open at the other end and constituting a receptacle for a roll of dental floss, the open end of the tube having a smooth interior surface, a bow-shaped frame having a shank making a snug sliding fit in the end of the handle, a portion of the length of the shank that extends into the tube having a slot in the surface thereof for receiving a portion of the length of a dental strand, the slot terminating within the portion of the shank that is inside the tube so that the strand may be wedged and locked between the shank and the inner surface of the end of the tube, the bow having a flange adjacent the shank and an outer flange at the opposite end thereof, aligned strand slots in the periphery of the flanges, and means associated with the last mentioned flange for releasably locking the end of a strand of dental floss that is drawn across the bow, said last means comprising a head having screw threaded engagement with the outer flange and having a strand receiving slot on the outer surface thereof with at least a portion of the cap slot located at the same radial distance from the center of threaded turning of the head as is the slot in the outer flange and movable into and out of alignment with the last mentioned slot as the head is turned on the bow.

THOMAS E. LUZAR.

REFERENCES CITED

The following references are of record in the file of this patent:

UNITED STATES PATENTS

| Number | Name | Date |
|---|---|---|
| 1,161,043 | Gallas | Nov. 23, 1915 |
| 1,506,417 | Donals | Aug. 26, 1924 |
| 1,952,358 | Bohm | Mar. 27, 1934 |
| 2,162,240 | Boldusoff | June 13, 1939 |